Sept. 6, 1938. J. A. STREUN 2,129,630
DRIER FOR COTTON TREATING MACHINES
Filed March 6, 1936 2 Sheets-Sheet 2
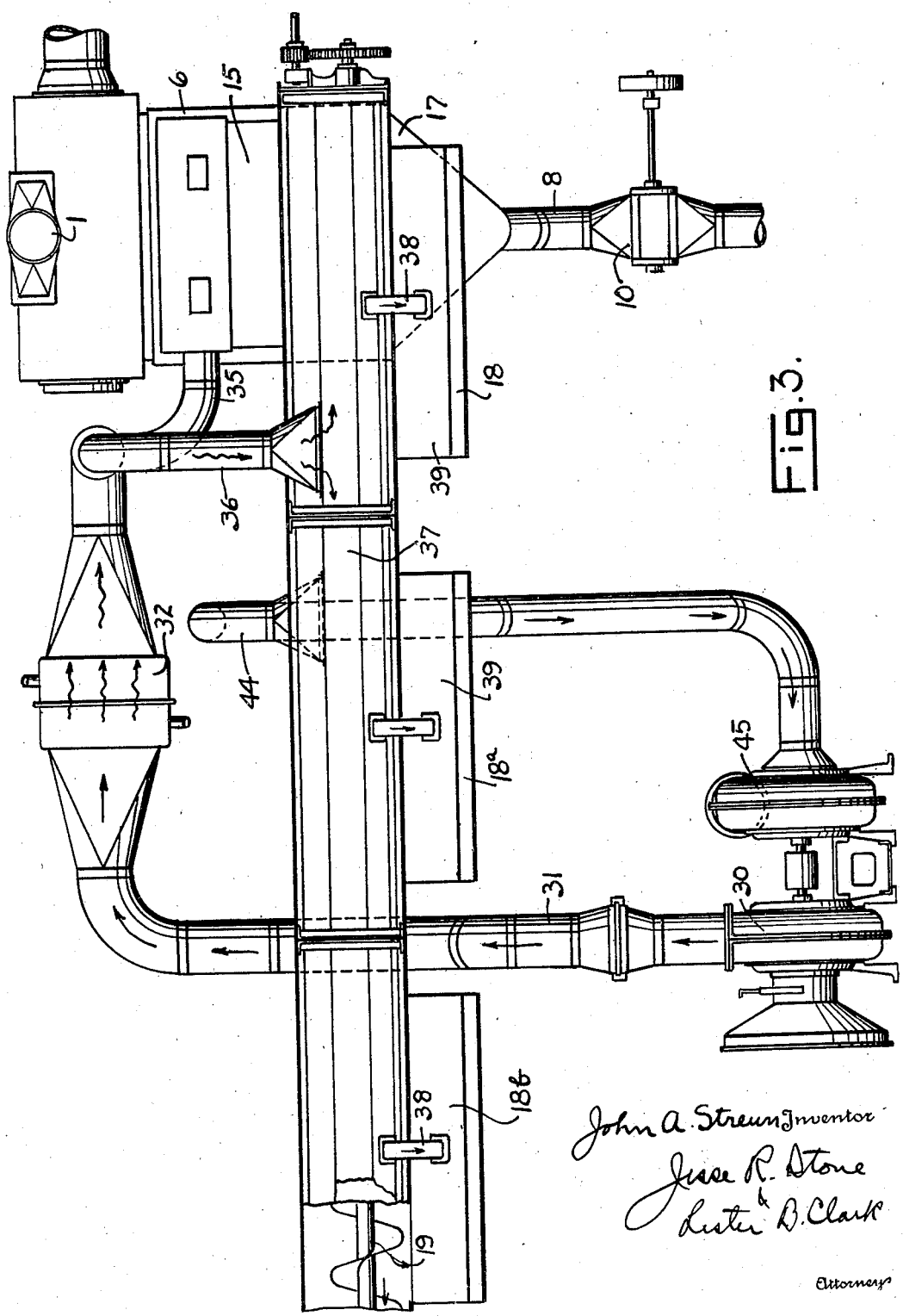

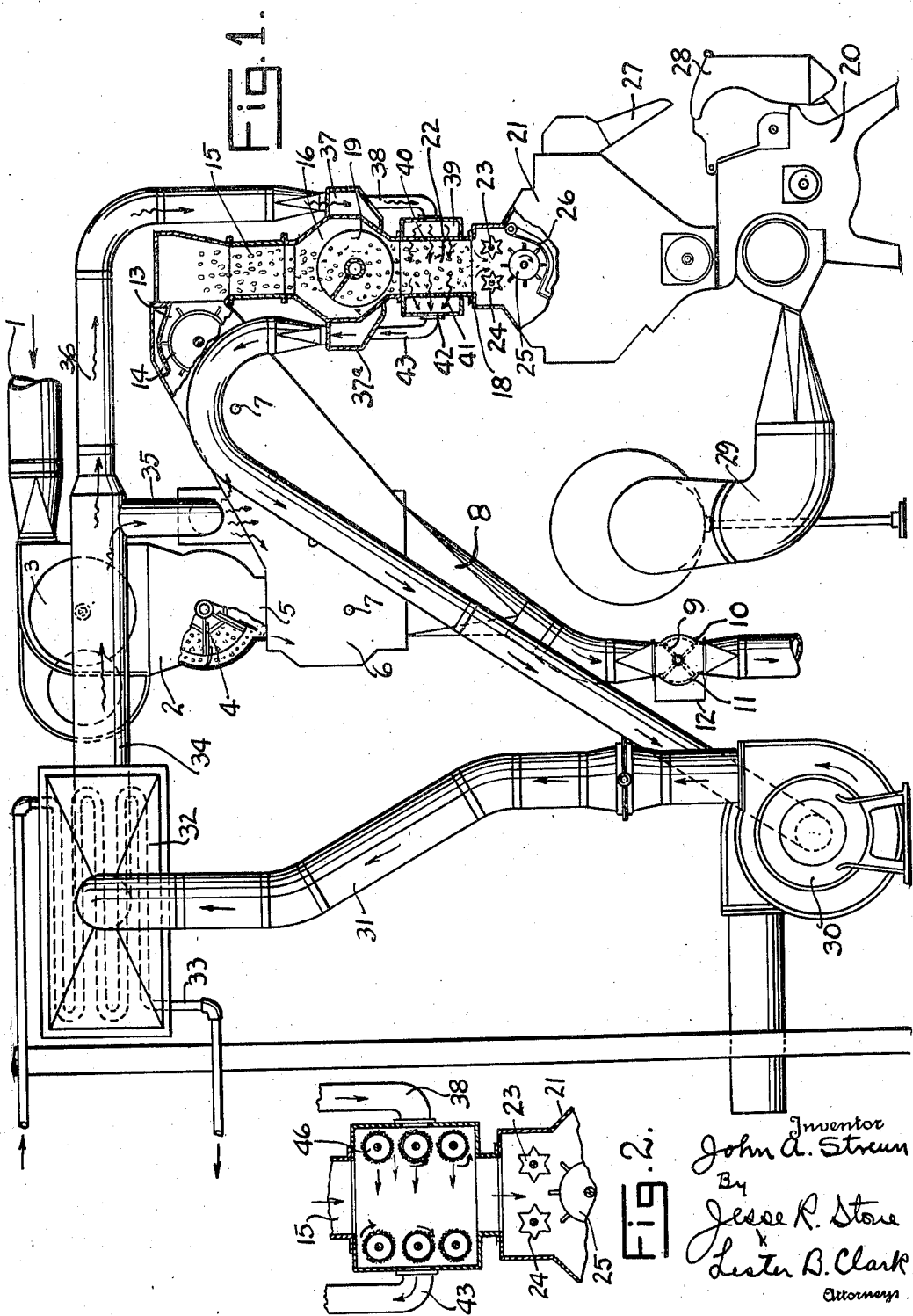

Patented Sept. 6, 1938

2,129,630

UNITED STATES PATENT OFFICE 2,129,630

DRIER FOR COTTON TREATING MACHINES

John Arnold Streun, Sherman, Tex., assignor to Hardwicke-Etter Company, Sherman, Tex., a corporation Application March 6, 1936, Serial No. 67,433

7 Claims. (Cl. 19—74)

This invention relates to the drying of cotton during the time it is being treated in the ordinary devices used in handling cotton on its way from the wagon to the gin.

It is an object of the invention to submit the stream of cotton passing to the gin to a cross draft of hot air at a point where the cotton is moving slowly and is better adapted to be dried during its passage therethrough.

It is a further object to treat the cotton in a comparatively narrow passage after it has been submitted to a partial cleaning action.

It is a further object of the invention to provide means in connection with the drying chamber to regulate the rate of movement of the cotton so that it may be subjected to the drying operation for the desired length of time.

It is a further object of the invention to deliver the current of hot air for drying so that the cotton will be heated to some extent before it is submitted to the action of the air current.

It is another object of the invention to submit the stream of cotton moving toward the gin to a cross current of heated air and to provide means to assure that the cotton move in a continuous uniform stream through the passage where it is thus being dried.

The further objects and advantages of the invention will appear more clearly from a description of the device taken in relation to the drawings herewith.

In the drawings Fig. 1 is a side view partly in elevation with certain parts broken away for greater clearness, the view being partly diagrammatic.

Fig. 2 is a longitudinal section through the drying chamber and illustrating a somewhat different embodiment from that shown in Fig. 1.

Fig. 3 is a front elevation of the device showing the relative positions of the various parts.

In the drawings herewith I have shown an apparatus in which the cotton is treated on its way to the cotton gin. It is to be understood that the cotton is drawn up from the wagon by a suction pipe shown broken off at 1 in the drawings. This cotton at certain seasons and during periods of rain is filled with moisture in such manner that the cotton can not be sufficiently ginned in a uniform and satisfactory manner. It is necessary, therefore, to submit the cotton to a drying operation somewhere on its route before it reaches the gin. It is the principal object of this invention to submit the cotton to the drying operation at a point where it can be most conveniently and thoroughly done.

With reference to the drawings, the cotton passing in through the pipe 1 passes to a separator 2 of ordinary construction whereby the cotton is separated from the current of air which moves the cotton and the cotton is passed downwardly from the separator by a screen cylinder 3. At the lower part of the separator is a dropper or valve 4 arranged to rotate within the lower portion of the separator and having radial flights which receive the cotton between adjacent arms and by rotation carry it around and drop it from the lower end 5 into a cotton cleaner 6. It will be noted that the dropper 4 acts as a seal preventing the current of air from the separator from entering the cleaner.

The cleaner 6 is shown somewhat diagrammatically. It is intended to include any ordinary type of cleaner, the one shown consisting of a housing having therein transversely extending shafts 7 with rotating picker rolls therein which pass the cotton over the screen surface to eliminate therefrom a portion of the dirt and trash which accompanies the cotton. Said dirt and trash drop downwardly from the housing of the cleaner through a flue or pipe 8 to the trash pile.

In the trash outlet I have shown a dropper or valve 9 fitting closely within a chamber 10 in the outlet pipe and serving to prevent the passage of a draft of air downwardly with the trash. This rotating valve 9 has at one lateral side 11 a movable wall which may be used when the rotating valve becomes clogged to widen the passage past the valve and allow any accumulation of trash to drop past the valve. The lateral chamber 12 allows this movement. This is to be understood as an old construction forming no part of the present invention.

At the outlet end 13 of the cleaner is a rotating roller 14 which delivers the cotton into the chute 15 leading to the distributor chamber 16. Said roller 14 has radially projecting flights thereon which serve to prevent the passage of air outwardly with the cotton to the distributor.

The distributor includes an outer elongated housing 17 shown best in Fig. 3. It receives the cotton from the outlet 15 from the cleaner and feeds it to the various feeder cleaners, of which there is one above each gin. As will be seen from Fig. 3, in the lower wall of the elongated trough or housing 17 are downwardly extending hoppers 18, 18a and 18b, it being understood that as many gins may be connected with the distributor as may be found convenient and desirable.

Within the distributor chamber is a conveyor 19 and I have shown an ordinary screw conveyor therein which rotates in a direction to move the cotton from the feeder longitudinally of the distributor housing and thus feed it downwardly into one hopper after the other above the various feeder cleaners so that it may be carried down to the gin shown at 20 in Fig. 1. It is to be understood that as is usual with distributors of this character there will be an overflow at the remote end of the distributor trough so that surplus cotton not received within the hoppers of the various gins may be passed out onto the floor of the gin or other place for storage of cotton.

The passage or hopper 18 leading from the distributor downwardly to the cleaner 21 is preferably somewhat elongated so as to provide a passage 22 therethrough where the cotton is moving slowly and where it may be subjected to the drying operation. Below this passage 22 are feeder rolls 23 and 24, placed in such position as to receive the cotton from the hopper and move it downwardly to a kicker roll 25 which passes it over the upper screen 26 and downwardly into the cleaner. The rolls 23 and 24 rotate in opposite directions to carry the cotton downwardly between them and as will be obvious these rolls may be made to rotate at the desired rate of speed so as to regulate the rate of speed with which the cotton is carried downwardly out of the hopper. I am thus enabled to fix the time during which the cotton is submitted to the drying operation.

Below the cleaner feeder 21 the outlet chute 27 delivers the cotton downwardly to the gin breast 28. Cotton ginned in its passage through the gin 20 will be carried away through the lint flue 29.

My drier is connected with the cleaning and ginning apparatus so that the heated air from the drier may be employed in a most advantageous manner. With reference particularly to Fig. 1, it will be noted that a fan 30 blows air upwardly through the flue 31 to a heating chamber 32. In this chamber the air is heated. I have shown a steam coil 33 in the chamber but it is to be understood that any desirable type of heater may be employed.

The air passing over the heating coil is heated to the desired temperature and finds an outlet through the pipe 34. From pipe 34 the heated air passes partly through branch pipe 35 to the upper end of the cleaner 6. The larger portion of the heated air passes onwardly through the pipe 36 and downwardly to chamber 37 formed on one side of the distributor chamber. It will be understood that the heated air passing into the cleaner 6 has no particular discharge outlet. A portion may pass downwardly with the trash but no downward draft is permitted. Furthermore, the roller 14 at the outlet from the feeder acts as a valve to close the exit of the air at that point. The cotton is, however, heated in this cleaner so that it is better acted upon when it reaches the passage 22 wherein it is to be dried.

The chamber 37 at each side of the distributor trough extends the full length of said housing and conducts the air along said housing to each of the separate hoppers below the same. As will be noted from Fig. 3, the hot air entering chamber 37 along the side of the distributor housing passes to the various hoppers through downwardly extending passages 38, there being one of these flues or passages 38 leading to a longitudinal compartment 39 on each hopper. The hot air entering the side chamber 37 on the distributor trough through the inlet pipe 36 will fill the chamber 37 on one side of the distributor trough and the air in said chamber will be under some pressure due to the effect of the fan. It will find an outlet from the chamber or passage 37 through the pipes 38 into the chambers 39 at each hopper.

The chambers 39 are formed to extend the full length of the hoppers with which they are connected. The inner wall of each of these chambers 39 is perforated as shown at 40 so that the air will pass readily from said chambers into the hopper 22.

The opposite wall of each hopper is also perforated at 41 to allow passage of the hot air through into the chamber 42 at the opposite side of the hopper and from there will pass through an outlet pipe 43 similar in construction to the pipes 38 and will enter the lower wall of the side chamber 37a along the side of the distributor 16.

There is an outlet as shown at 44 in Fig. 3 leading from the chamber 37a to a suction fan 45 arranged to be operated from the same source of power as the blower fan 30. From this suction fan the heated air is blown to the atmosphere. This suction fan exerts a partial vacuum upon the side chamber 37a upon the distributor housing and assists in drawing the heated air transversely of the drying hopper 22. It will thus be seen that the heated air from the heater passing to the hopper 22 is acted upon from both sides of said hopper in order to cause a strong draft, the fan on the upstream side of the air passage serving to force it through the hopper and the suction fan at the outlet serving to draw it from the downstream side and through the heating passage.

It will now be understood that the cotton moving through the device on its way to the gin will be first cleaned and while being cleaned may be heated by air delivered to the cleaner. The cotton thus heated will pass from the feeder to the distributor and from the distributor will be moved along to the various gins, passing from the distributor through a cleaner 21 on its way downwardly to the gin. While the cotton is passing through the feeder 6 it will be moved at a comparatively high speed, and will pass outwardly in a stream which will be of sufficiently rapid rate to feed all or a plurality of gins. The distributor which has to move the cotton to all of the various gins also moves at a rapid rate so that the cotton moving downwardly through the distributor will find a passage from the distributor to the various hoppers in a very short length of time. After it has reached the hopper, however, it is fed to the cleaner 21 at a comparatively slow rate of speed. In passing through the hopper of each cleaner more time will be consumed than is necessary for it to pass through all of the preceding portion of the apparatus. Hence in the hopper where the cotton is moving at a slow rate of speed it is most convenient to submit it to the drying operation. A comparatively strong draft of hot air is circulated through the cotton in the hopper due to both the suction fan and the blower fan and a very effective drying action upon the cotton results. It will also be noted that some heating action upon the cotton takes place while it is in the distributor housing due to the fact that the lateral chambers 37 and 37a are connected along the lateral wall of the distributor housing in such manner as to heat the same. When the cotton is delivered to the hopper on any of the cleaners 21 it will be fairly well heated up to a point where the current of hot air will have a most effective drying action.

The rate of operation of the feeder rolls 24 at the lower end of the hopper may be regulated to keep the cotton within the hopper for the desired length of time, it being obvious that certain cotton may be in greater need of drying than other cotton. The effective drying of the cotton may be therefore obtained by this regulation of the speed of operation of the feeder rolls.

The cotton passes through the feeder cleaner 21 at a comparatively rapid rate of speed and the cotton will be delivered to the gin in good condition for effective ginning thereof.

In Fig. 2 I have shown a modification which may be made of the drying hopper. In this modification the inner wall of each chamber 39, which constitutes the outer boundary of the hopper, is omitted and a plurality of closely spaced screen rollers 46 are substituted. These rollers are arranged to rotate so that their inner sides are moving downwardly. The heated air will pass through the screen rollers and into the stream of cotton moving downwardly through the hopper and outwardly through the exit pipe 43. It will be seen that the sticking of the cotton in the flue will be avoided in this manner. Any tendency of the cotton to be blown against the outlet wall of the hopper and there adhering will be prevented. Furthermore these screen rollers can be rotated at the desired rate of speed so as to assure the movement of the cotton at the rate desired through the drying chamber. Ordinarily this arrangement will be unnecessary but it is shown as being within the contemplation of the invention and will be used where the type of cotton being ginned makes it desirable.

What is claimed as new is:

1. In combination, a cotton cleaner having outlets for cotton and for trash, means to seal the passage of air currents from said outlets, a distributor arranged to receive cotton from said cleaner, feeders below said distributor, a hopper for each feeder to receive cotton from said distributor, means to heat the cotton in said distributor and means to cause a current of hot air transversely through said hoppers.

2. In combination, a cotton cleaner having outlets for cotton and for trash, means to seal the passage of air currents from said outlets, a distributor arranged to receive cotton from said cleaner, feeders below said distributor, a hopper for each feeder to receive cotton from said distributor, means to heat the cotton in said cleaner, means to heat the cotton in said distributor, and means to cause a current of hot air transversely through said hoppers.

3. In combination, a cotton cleaner having outlets for cotton and for trash, means to seal the passage of air currents from said outlets, a distributor arranged to receive cotton from said cleaner, feeders below said distributor, a hopper for each feeder to receive cotton from said distributor, heating chambers along the sides of said distributor, and means to force a current of hot air through said chambers and transversely through said hoppers and the cotton passing through said hoppers.

4. A cotton feeder, a hopper thereon, air chambers at opposite sides of said hopper, screening members at the inner portions of said chambers within said hopper, including a plurality of superposed foraminated rollers on each side of said hopper rotatable in a direction to move cotton downwardly in said hopper, means to deliver cotton into said hoppers, and means to cause a current of hot air from said chambers transversely of said hopper, said screening members and the cotton in said hoppers.

5. A series of cotton gins, feeders therefor, a distributor housing above said feeders, a distributor therein, chambers on each side of said housing, a hopper on each feeder communicating with said distributor, means on said feeders to regulate the speed of travel of cotton from said distributor to said feeders, a heater, and means to force a draft of air from said heater through said chambers to preheat said cotton and transversely across said hoppers to dry said cotton in said hoppers.

6. A series of cotton gins, feeders therefor, a distributor housing above said feeders, a distributor therein, chambers on each side of said housing, a hopper on each feeder communicating with said distributor, means on said feeders to regulate the speed of travel of cotton from said distributor to said feeders, a heater, and means positioned upstream from said distributor to clean and preheat said cotton, means to deliver heated air to said chambers, and flues for heated air from one of said chambers to conduct heated air transversely through said hoppers to the other of said chambers in the manner described.

7. A cotton feeder, a pair of feeding rollers at the upper end thereof, a hopper to conduct cotton downwardly to said rolls, a distributor above said hopper to deliver cotton thereto, means outside said distributor to heat the walls of said distributor, and flues to conduct hot air to said hopper and transversely across said hopper and out the opposite side thereof to dry preheated cotton passing therethrough.

JOHN ARNOLD STREUN.